United States Patent
Wilson

(10) Patent No.: US 9,210,209 B2
(45) Date of Patent: Dec. 8, 2015

(54) EXTENSIBLE BROWSER PLUGIN INTERFACE

(75) Inventor: Brett E. Wilson, Sunnyvale, CA (US)

(73) Assignee: Google Inc., Mountain View, CA (US)

(*) Notice: Subject to any disclaimer, the term of this patent is extended or adjusted under 35 U.S.C. 154(b) by 710 days.

(21) Appl. No.: 13/436,659

(22) Filed: Mar. 30, 2012

(65) Prior Publication Data

US 2015/0195263 A1 Jul. 9, 2015

Related U.S. Application Data

(60) Provisional application No. 61/482,174, filed on May 3, 2011.

(51) Int. Cl.
*G06F 9/46* (2006.01)
*G06F 9/445* (2006.01)
*H04L 29/08* (2006.01)
*H04L 29/06* (2006.01)
*G06F 9/54* (2006.01)

(52) U.S. Cl.
CPC ............... *H04L 67/02* (2013.01); *G06F 9/541* (2013.01); *H04L 67/42* (2013.01)

(58) Field of Classification Search
CPC .......... H04L 67/02; H04L 67/42; G06F 9/541
USPC ....................................................... 719/328
See application file for complete search history.

(56) References Cited

U.S. PATENT DOCUMENTS

| 8,352,967 B2* | 1/2013 | Labour et al. ................. 719/328 |
| 9,009,739 B2* | 4/2015 | Labour et al. ................. 719/328 |
| 2009/0222925 A1* | 9/2009 | Hilaiel et al. .................... 726/25 |
| 2010/0325715 A1* | 12/2010 | Deurbrouck et al. ............. 726/9 |
| 2013/0191526 A1* | 7/2013 | Zhao ............................. 709/223 |

OTHER PUBLICATIONS

Mark Dowd, Ryan Smith, David Dewey; Attacking Interoperability; 2009; 84 pages.*
Concepts for working with PPAPI—Levels of the API; Sep. 14, 2010; 2 pages.*
Important Concepts for Working with PPAPI; May 11, 2010; 3 pages.*
Gecko Plugin API References—Version, UI, and Status Information; Sep. 2008; 10 pages.*

* cited by examiner

*Primary Examiner* — H S Sough
*Assistant Examiner* — Kimberly Jordan
(74) *Attorney, Agent, or Firm* — Fish & Richardson P.C.

(57) ABSTRACT

Methods, systems, and apparatus, including computer programs encoded on a computer storage medium, for an extensible browser plugin interface. In one aspect, a method includes receiving, at a browser plugin interface, an interface request from a plugin, where the interface request includes an interface identifier string that identifies a particular interface; determining, using the interface identifier string, whether the particular interface is supported by the browser; and if it is determined that the particular interface is supported by the browser, returning to the plugin a virtual function table (vtable) of one or more functions, wherein the vtable is associated with the particular interface identified by the interface request.

22 Claims, 3 Drawing Sheets

EXTENSIBLE BROWSER PLUGIN INTERFACE

CLAIM OF PRIORITY

This application claims the benefit under 35 U.S.C. §119 (e) of Provisional U.S. Patent Application Ser. No. 61/482,174, filed on May 3, 2011, the entire contents of which are hereby incorporated by reference.

BACKGROUND

This specification relates to a browser plugin interface.

A browser plugin is a separate software module that modifies the interface and the behavior of a browser. A conventional browser is configured to provide a plugin interface for runtime support of its hosted plugins. A typical plugin is developed with the expectation that it will be able to use browser capabilities at runtime, since plugins are not implemented to execute independently from a browser. A browser can expose a subset of its capabilities to its supported plugins through its plugin interface. For example, a plugin may be programmed to invoke one or more browser print functions that are exposed in a browser plugin interface.

Netscape Plugin Application Programming Interface (NPAPI) is a conventional browser plugin interface. Each browser function that is exposed in NPAPI has a unique numerical identifier. Browser and plugin developers conventionally hard code the numerical identifiers of functions they wish to invoke through NPAPI. The size of NPAPI has increased over time as functions have been added to the plugin interface, and multiple version levels of NPAPI exist. Maintaining compatibility between browser and plugin implementations typically requires the implementations to support a minimum NPAPI version level that includes the numerical identifiers of their commonly used functions.

SUMMARY

This specification describes technologies relating to an extensible browser plugin interface.

In general, one aspect of the subject matter described in this specification can be embodied in methods that include the actions of receiving, at a browser plugin interface, an interface request from a plugin, where the interface request includes an interface identifier string that identifies a particular interface; determining, using the interface identifier string, whether the particular interface is supported by the browser; and if it is determined that the particular interface is supported by the browser, returning to the plugin a virtual function table (vtable) of one or more functions, wherein the vtable is associated with the particular interface identified by the interface request.

Other embodiments of this aspect include corresponding systems, apparatus, and computer program products. A system of one or more computers can be configured to perform particular operations or actions by virtue of having software, firmware, hardware, or a combination of them installed on the system that, in operation, causes the system to perform the actions. One or more computer programs can be configured to perform particular operations or actions by virtue of including instructions that, when executed by data processing apparatus, cause the apparatus to perform the actions.

These and other embodiments can optionally include one or more of the following features. If it is determined, using the interface identifier string, that the particular interface is not supported by the browser: returning an error code to the plugin. The interface identifier string indicates a version level of the particular interface. The interface identifier string format includes an interface name, a delimiter character, and a version number. Prior to returning the vtable: determining that the particular interface is identified as a trusted interface; and determining that the plugin has appropriate privileges for executing the trusted interface functionality. The interface is identified as a trusted interface based on a substring in the interface identifier string. Determining that the plugin has appropriate privileges includes determining a level of privileges assigned to the plugin. Determining whether the particular interface is supported by the browser comprises: determining whether the plugin has access privileges for the particular interface.

In general, one aspect of the subject matter described in this specification can be embodied in methods that include the actions of receiving, at a browser plugin interface, a trusted interface request from a plugin, where the trusted interface request includes a trusted interface identifier string that identifies a particular trusted plugin interface; determining whether the plugin has privileges to execute a trusted interface; if the plugin has the privileges to execute the trusted interface: determining, using the trusted interface identifier string, whether the particular interface is supported by the browser; and returning to the plugin a virtual function table (vtable) of one or more functions, wherein the vtable is associated with the particular trusted interface identified by the trusted interface request.

Other embodiments of this aspect include corresponding systems, apparatus, and computer program products. A system of one or more computers can be configured to perform particular operations or actions by virtue of having software, firmware, hardware, or a combination of them installed on the system that, in operation, causes the system to perform the actions. One or more computer programs can be configured to perform particular operations or actions by virtue of including instructions that, when executed by data processing apparatus, cause the apparatus to perform the actions.

These and other embodiments can optionally include one or more of the following features. The method further includes returning an error code to the plugin if the plugin does not have the privileges to execute the trusted interface. The method further includes returning an error code to the plugin if the particular trusted interface is not supported by the browser. The trusted interface identifier string includes a substring indicating that the particular plugin interface is a trusted plugin interface. The trusted interface identifier string indicates a version level of the particular trusted plugin interface. The trusted interface identifier string format is an interface name, a delimiter character, and a version number.

Particular embodiments of the subject matter described in this specification can be implemented so as to realize one or more of the following advantages. An interface virtual function table, i.e., vtable, allows for a grouping of one or more functions in terms of the higher level browser capability they support. Different versions of an interface vtable can be created by adding or removing functions. New interfaces can be added to a browser API by extending existing interfaces. A browser and a plugin respectively can support multiple versions of an interface to optimize compatibility across a wide variety of implementations.

In some implementations, each interface is associated with a unique string-based interface identifier. Interface identifier strings provide an implementation-independent standard naming convention, simplifying browser and plugin development. A version level of a particular interface can be designated by the value of its string-based interface identifier.

Identifier strings that contain versioning information enable plugins and browsers to perform runtime version checking based on the identifier alone. Iteration over a list of the string-based interface identifiers enables rapid iteration over all the interfaces exposed in a browser plugin interface.

Trusted interfaces, which are those interfaces that provide access to secure memory or functionality, can be identified using their interface identifiers. Runtime access to a browser trusted interface can be enforced by a browser and be limited to plugins that have been given the appropriate privileges for executing the interface functionality.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes an extensible browser plugin interface. Browser capabilities are represented in the browser plugin API as a set of interfaces. Each interface corresponds to a named virtual function table, "vtable," which represents a group of browser-implemented functions. A plugin requests an interface, through a browser plugin interface, by providing the string-based identifier of the interface, and the browser returns a vtable corresponding to that interface if it supports the interface. The plugin then can invoke any of the functions in the vtable directly at runtime without using the browser plugin API. Trusted interfaces (i.e., interfaces that provide access to secure memory or functionality) can be identified using specified tokens, e.g., the token "trusted," that are integrated into their interface identifiers. A particular plugin, installed in advance on a system, can be marked as a trusted plugin by being associated with a "trusted" flag. This plugin would automatically receive additional privileges based on the fact that this trusted flag is set. A browser thus can enforce system security by returning a trusted interface only to a plugin that is determined to have appropriate access privileges.

Figure 1:
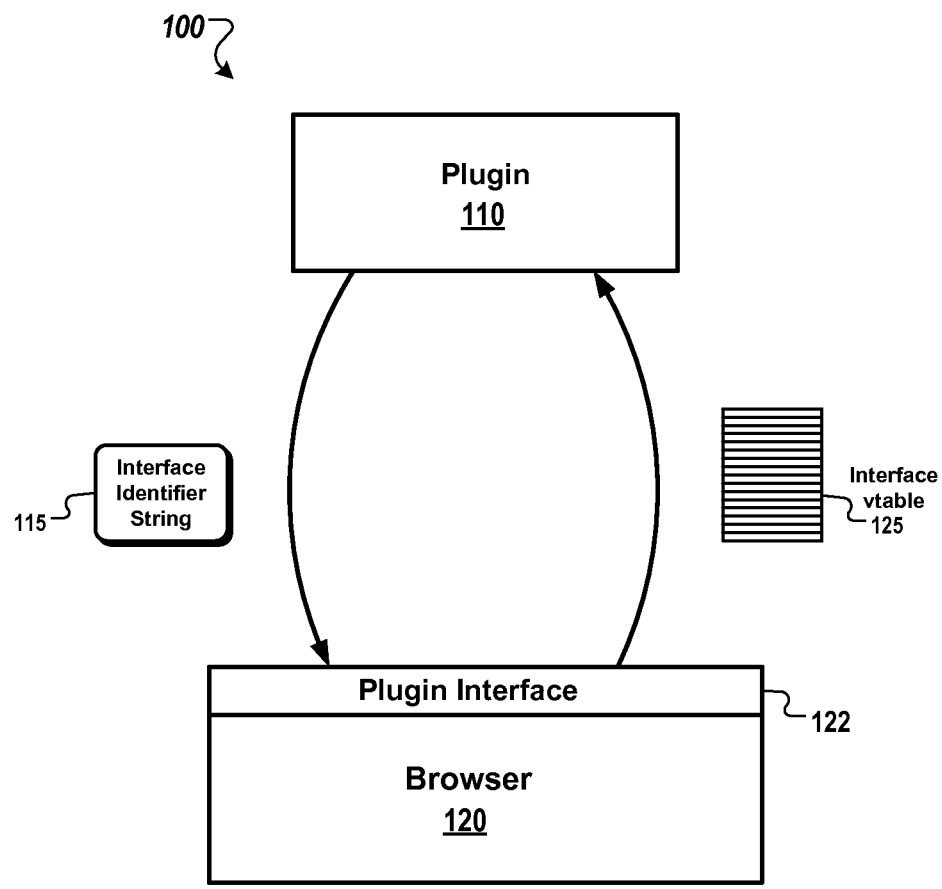
FIG. 1 is a diagram of an example system configuration in which a plugin requests and receives direct runtime access to a browser capability through the browser plugin interface.

FIG. 1 is a diagram of an example system configuration 100 in which a plugin requests and receives direct runtime access to a browser capability through the browser plugin interface.

In some implementations, the runtime access to a browser capability is provided as an interface vtable containing function pointers of a grouping of browser-implemented functions associated with the capability. A plugin uses the vtable at runtime for dynamic binding to the browser functions. The plugin invokes a browser function directly using a function pointer from the vtable that provides the address of the function executable.

An entire vtable can be referenced as a discrete interface by both a plugin and a browser. In some implementations, a browser and a plugin are configured to use the vtable as a class structure. In the runtime layout of a class structure, access to the single set of its class methods is shared by all instances of the class. In this type of configuration, it is ensured that the browser and the plugin will invoke the vtable functions using the same set of function pointers even though each is accessing the vtable functions using its own copy of the vtable.

A plugin 110 makes a request for access to a particular interface by providing its unique interface identifier string 115 to the browser 120, using the plugin interface 122 of the browser.

In some implementations, interface identifiers are assigned according to a standard naming convention, enabling plugin developers and browser developers to adopt an implementation-independent interface referencing scheme. For example, a plugin and a browser that both are written in C++ can each implement a void*GetInterface(const char*interface_name) function for the other to call to access a particular interface using its identifier string interface_name.

In some implementations, an interface identifier also specifies the version level of an interface. A version level may signify updated implementations of the vtable functions, an update to the composition of the vtable, or a combination. In some implementations, the format of an interface identifier string that includes version information is <interface name><delimiter><version> (e.g., "print; 1.0"). In some alternative implementations, the format of an interface identifier string is <interface name>, and the version information is included in the interface name (e.g., "print1").

A plugin and browser respectively may be configured to support multiple versions of the same interface, or, alternatively, a plugin and browser respectively may be configured to support a particular version of an interface. In some implementations, the version level specified in the interface identifier string is used to determine compatibility between the plugin and browser implementations. For example, a newer browser implementation can support multiple version levels of the same interface, ensuring that it can return an interface that is compatible with a previous interface version level that is requested by an older plugin implementation.

Once the plugin 110 has access to the vtable 125, the plugin has direct runtime access to browser-implemented functions because it has the address of each of the functions. For example, a plugin that receives a browser print capability vtable will be able to call any of the browser print functions represented in the vtable without using the browser plugin interface 122.

Figure 2:
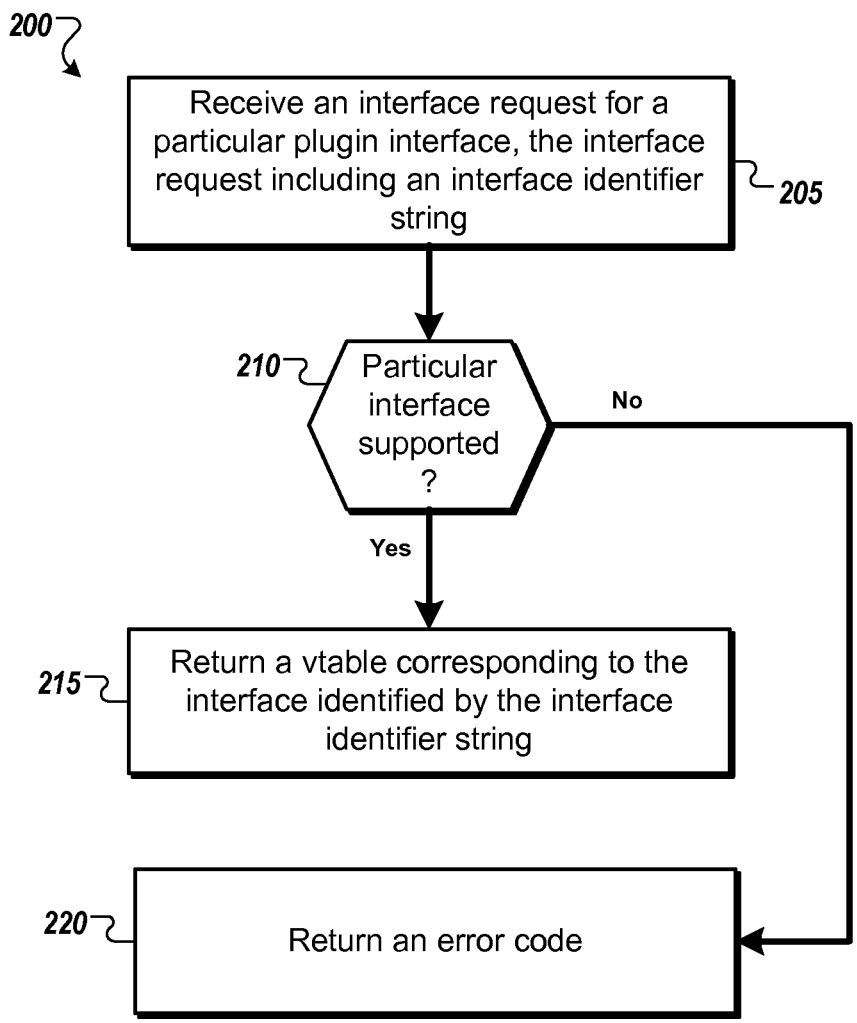
FIG. 2 is a flow diagram of an example method for handling a runtime request from a plugin to access an interface.

FIG. 2 is a flow diagram of an example method 200 for handling a runtime request from a plugin to access an interface. For convenience, the method 200 will be described with respect to a system that includes one or more computers and performs the method 200. In some implementations, the method 200 is performed by a browser to provide a plugin with access to a discrete browser capability, for example, as described above with reference to FIG. 1.

The system receives 205 an interface request that includes an interface identifier string. The system uses the interface identifier string to determine 210 whether the particular interface identified by the identifier string is supported by the system.

If the system supports the particular interface requested by the plugin, a vtable containing a set of one or more function pointers and named by the interface identifier string is returned 215 to the plugin.

If the system does not support the particular interface requested by the plugin, the browser returns 220 an error code (e.g., a null value) to the plugin. In some implementations, a plugin may be designed to handle returned error codes from interface requests. For example, a newer plugin may be developed to support current and previous versions of a particular interface. If the request for the current version of the interface fails because the browser is older and does not support that version, the newer plugin may handle the error by making a subsequent request to the browser for a previous version of the interface. Consequently, a newer version of a plugin can be designed to maintain compatibility with different browser implementations.

Figure 3:
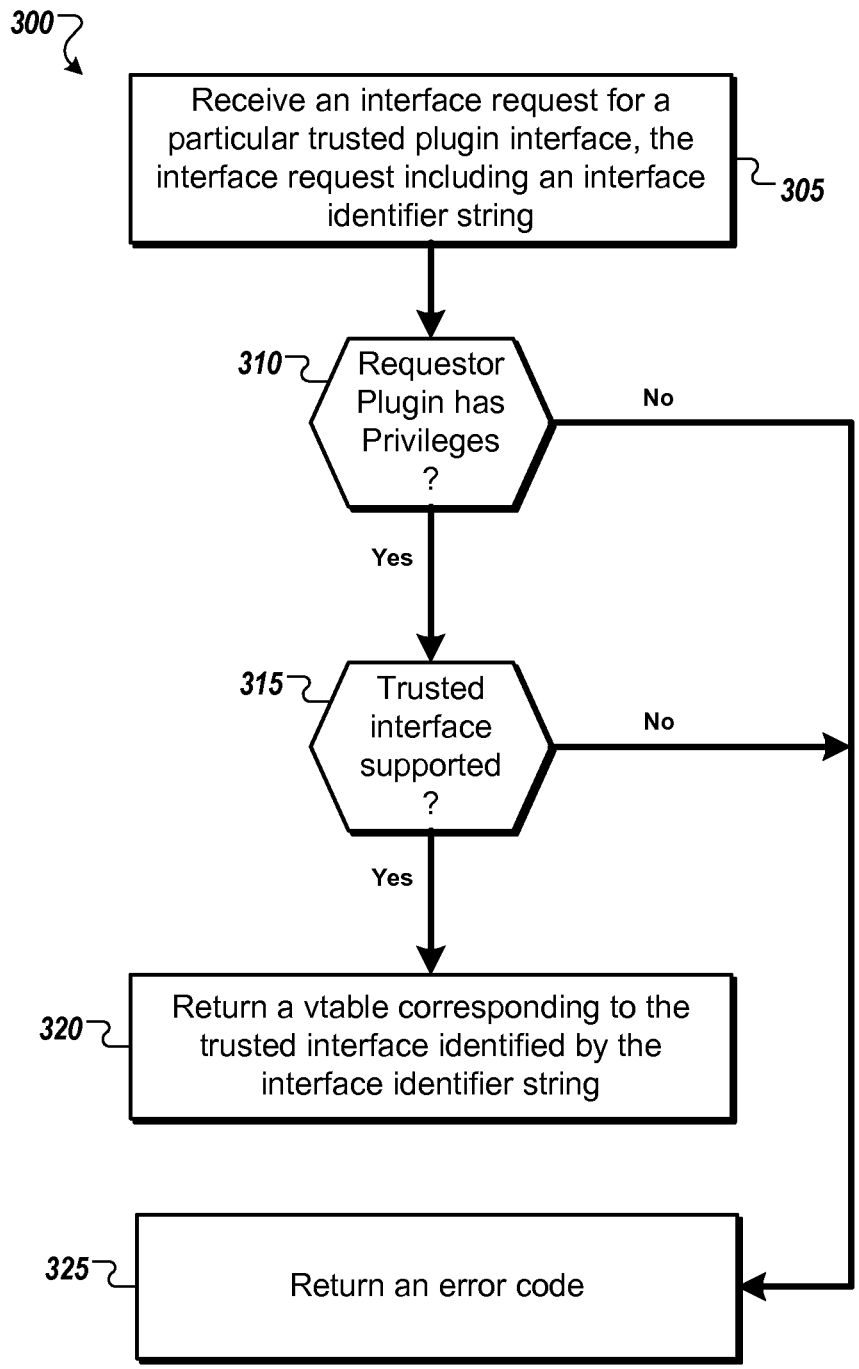
FIG. 3 is a flow diagram of an example method for handling a runtime request from a plugin to access a trusted interface.

FIG. 3 is a flow diagram of an example method 300 for handling a runtime request from a plugin to access a trusted interface. For convenience, the method 300 will be described with respect to a system that includes one or more computers and performs the method 300. In some implementations, the method 300 is performed by a browser to provide access to a discrete browser capability, for example, as described above with respect to FIG. 1.

In some implementations, trusted browser interfaces are identified using their interface identifiers. Trusted browser interfaces are those interfaces that provide access to secure memory or functionality. In some implementations, the system identifies a trusted interface by recognizing a specified substring within the identifier string. For example, if the substring contains the word "Trusted" or some other identifying token, filtering out of the trusted interfaces from a browser API can be performed solely based on recognition of the presence of the token in the supported interface identifiers. Runtime access to a browser trusted interface can be enforced by a browser and be limited to plugins that have been given the appropriate privileges for executing the interface functionality.

In response to receiving 305 a request from a plugin for a trusted interface, the system determines 310 the level of privileges assigned to the plugin. In some implementations, the request for a trusted interface includes an interface identifier string that has a "trusted" substring.

In some implementations, an installed plugin is marked as a trusted plugin, e.g., by having a "trusted" flag set. This plugin would automatically receive additional access privileges at runtime based on the fact that this trusted flag is set. New plugins downloaded from the web would not have this flag set by default and thus would not be granted these additional access privileges.

In some other implementations, a more fine-grained access control for plugins is implemented. For example, a plugin might request persistent storage on the user's computer, which could be granted on a case-by-case basis by the user, or by a previously-configured access control list. In some implementations, particular privileges required by an interface can be encoded in its interface identifier to facilitate access control for plugins. In some implementations, for example, interface identifiers can include "FileIO {Persistent}" for a persistent file I/O interface, and "Network {UDP, P2P}" for a peer-to-peer implementation of the Internet User Datagram Protocol (UDP) protocol. In some alternative implementations, a system is configured to support plugin access control using a separate internal mapping of each interface identifier to its required privileges.

If the requesting plugin does not have the appropriate level of privileges to execute the requested trusted interface, the system returns 325 an error code to the requesting plugin. This enforces system security, since a plugin will not be given direct access to functions if the plugin does not have the appropriate level of access privileges. If the plugin does have the appropriate level of privileges, the system determines 315 whether the requested interface is supported as previously described with reference to FIG. 2.

If the requested trusted interface is supported, the system responds by returning a vtable 320 to the plugin. The vtable includes addresses of one or more browser-implemented functions, as previously described with reference to FIG. 1. If the requested interface is not supported, the system returns an error code 325 as previously described with reference to FIG. 2.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, (e.g., a machine-generated electrical, optical, or electromagnetic signal) that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-transitory memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving, at a web browser on a computer system, multiple plugin interface requests each from a respective plugin, where each of the plugin interface requests includes an interface identifier string that identifies a particular plugin interface;
   determining, for each of the multiple plugin interface requests using the respective interface identifier string, whether the particular plugin interface is supported by the web browser;
   in response to determining, for each request in a first subset of the multiple plugin interface requests, that the particular plugin interface is supported by the web browser, automatically determining, by the computer system for each request in the first subset, that the particular plugin interface is identified as a trusted interface that provides access to secure memory or functionality;

automatically determining, by the computer system for each request in the first subset, that the plugin has appropriate privileges for executing trusted interface functionality; and in response to determining that the plugin has appropriate privileges for executing trusted interface functionality, returning, for each request in the first subset, to the plugin a virtual function table (vtable) of one or more functions, wherein the vtable is associated with the particular plugin interface identified by the interface request.

2. The method of claim 1, comprising:
in response to determining, for each request in a second, different subset of the multiple plugin interface requests, using the interface identifier string, that the particular plugin interface is not supported by the web browser, returning, for each request in the second subset, an error code to the plugin.

3. The method of claim 1, wherein the interface identifier string indicates a version level of the particular plugin interface.

4. The method of claim 3, wherein the interface identifier string format includes an interface name, a delimiter character, and a version number, all for the particular plugin interface.

5. The method of claim 1, wherein at least one of the particular plugin interfaces is identified as a trusted interface based on a substring in the interface identifier string.

6. The method of claim 1, wherein determining that at least one of the plugins has appropriate privileges includes determining a level of privileges assigned to the plugin.

7. The method of claim 1, comprising:
determining whether the plugin has access privileges for the particular plugin interface in response to receiving the plugin interface request from the plugin.

8. The method of claim 1, wherein:
the web browser supports multiple plugin interfaces; and
determining, for each of the multiple plugin interface requests using the respective interface identifier string, whether the particular plugin interface is supported by the web browser comprises determining, for each of the multiple plugin interface requests using the respective interface identifier string, whether the particular plugin interface is included in the multiple plugin interfaces.

9. The method of claim 1, wherein automatically determining, by the computer system for each request in the first subset, that the plugin has appropriate privileges for executing trusted interface functionality comprises determining that the plugin is installed in the web browser.

10. The method of claim 1, wherein automatically determining, for each request in the first subset, that the plugin has appropriate privileges for executing trusted interface functionality comprises determining, for each request in the first subset, that the plugin has appropriate privileges for executing trusted interface functionality using an access control list or the interface identifier string.

11. The method of claim 7, wherein determining whether the plugin has access privileges for the particular plugin interface comprises determining, using an access control list or the interface identifier string, whether the plugin has access privileges for the particular plugin interface.

12. A computer storage medium encoded with a computer program, the computer program comprising instructions that, when executed by a data processing apparatus, cause the data processing apparatus to perform operations comprising:

receiving, at a web browser on the data processing apparatus, multiple plugin interface requests each from a respective plugin, where each of the plugin interface requests includes an interface identifier string that identifies a particular plugin interface;

determining, for each of the multiple plugin interface requests using the respective interface identifier string, whether the particular plugin interface is supported by the web browser;

in response to determining, for each request in a first subset of the multiple plugin interface requests, that the particular plugin interface is supported by the web browser, automatically determining, by the data processing apparatus for each request in the first subset, that the particular plugin interface is identified as a trusted interface that provides access to secure memory or functionality;

automatically determining, by the data processing apparatus for each request in the first subset, that the plugin has appropriate privileges for executing trusted interface functionality; and in response to determining that the plugin has appropriate privileges for executing trusted interface functionality, returning, for each request in the first subset, to the plugin a virtual function table (vtable) of one or more functions, wherein the vtable is associated with the particular plugin interface identified by the interface request.

13. A system, comprising:
one or more computers including one or more storage devices storing instructions that when executed by the one or more computers cause the one or more computers to perform operations comprising:

receiving, at a web browser on at least one of the computers, multiple plugin interface requests each from a respective plugin, where each of the plugin interface requests includes an interface identifier string that identifies a particular plugin interface;

determining, for each of the multiple plugin interface requests using the respective interface identifier string, whether the particular plugin interface is supported by the web browser; and in response to determining, for each request in a first subset of the multiple plugin interface requests, that the particular plugin interface is supported by the web browser, automatically determining, by at least one of the computers for each request in the first subset, that the particular plugin interface is identified as a trusted interface that provides access to secure memory or functionality;

automatically determining, by at least one of the computers for each request in the first subset, that the plugin has appropriate privileges for executing trusted interface functionality; and in response to determining that the plugin has appropriate privileges for executing trusted interface functionality, returning, for each request in the first subset, to the plugin a virtual function table (vtable) of one or more functions, wherein the vtable is associated with the particular plugin interface identified by the interface request.

14. A method, comprising:
receiving, at a web browser on a computer system, multiple trusted plugin interface requests each from a respective plugin, where each of the trusted plugin interface requests includes a trusted interface identifier string that identifies a particular trusted plugin interface;

automatically determining, by the computer system for each of the multiple trusted plugin interface requests, whether the respective plugin has privileges to execute a trusted interface that provides access to secure memory or functionality; and in response to determining, for each request in a first subset of the multiple trusted plugin interface requests, that the plugin has the privileges to execute the trusted interface:
determining, for each request in the first subset using the respective trusted interface identifier string, whether the particular trusted plugin interface is supported by the web browser, and
in response to determining that the particular trusted plugin interface is supported by the web browser, returning, for at least some of the requests in the first subset, to the plugin a virtual function table (vtable) of one or more functions, wherein the vtable is associated with the particular trusted interface identified by the trusted plugin interface request.

15. The method of claim 14, further comprising returning, for each request in a second, different subset, an error code to the plugin if the plugin does not have the privileges to execute the trusted interface.

16. The method of claim 14, further comprising returning, for at least some of the requests in the first subset, an error code to the plugin if the particular trusted plugin interface is not supported by the web browser.

17. The method of claim 14, where the trusted interface identifier string includes a substring indicating that the particular trusted plugin interface is a trusted plugin interface.

18. The method of claim 14, where the trusted interface identifier string indicates a version level of the particular trusted plugin interface.

19. The method of claim 18, wherein the trusted interface identifier string format includes an interface name, a delimiter character, and a version number, all for the particular plugin interface.

20. The method of claim 14, wherein automatically determining, for each of the multiple trusted plugin interface requests, whether the respective plugin has privileges to execute a trusted interface that provides access to secure memory or functionality comprises determining, for each of the multiple trusted plugin interface requests, whether the respective plugin has privileges to execute a trusted interface that provides access to secure memory or functionality using an access control list or the interface identifier string.

21. A computer storage medium encoded with a computer program, the computer program comprising instructions that, when executed by data processing apparatus, cause the data processing apparatus to perform operations comprising:
receiving, at a web browser on the data processing apparatus, multiple trusted plugin interface requests each from a respective plugin, where each of the trusted plugin interface requests includes a trusted interface identifier string that identifies a particular trusted plugin interface;

automatically determining, by the data processing apparatus for each of the multiple trusted plugin interface requests, whether the respective plugin has privileges to execute a trusted interface that provides access to secure memory or functionality; and in response to determining, for each request in a first subset of the multiple trusted plugin interface requests, that the plugin has the privileges to execute the trusted interface:
determining, for each request in the first subset using the respective trusted interface identifier string, whether the particular trusted plugin interface is supported by the web browser, and
in response to determining that the particular trusted plugin interface is supported by the web browser, returning, for at least some of the requests in the first subset, to the plugin a virtual function table (vtable) of one or more functions, wherein the vtable is associated with the particular trusted interface identified by the trusted plugin interface request.

22. A system, comprising:
one or more computers including one or more storage devices storing instructions that when executed by the one or more computers cause the one or more computers to perform operations comprising:
receiving, at a web browser on at least one of the computers, multiple trusted plugin interface requests each from a respective plugin, where each of the trusted plugin interface requests includes a trusted interface identifier string that identifies a particular trusted plugin interface;

automatically determining, by at least one of the computers for each of the multiple trusted plugin interface requests, whether the respective plugin has privileges to execute a trusted interface that provides access to secure memory or functionality; and in response to determining, for each request in a first subset of the multiple trusted plugin interface requests, that the plugin has the privileges to execute the trusted interface:
determining, for each request in the first subset using the respective trusted interface identifier string, whether the particular trusted plugin interface is supported by the web browser, and
in response to determining that the particular trusted plugin interface is supported by the web browser, returning, for at least some of the requests in the first subset, to the plugin a virtual function table (vtable) of one or more functions, wherein the vtable is associated with the particular trusted interface identified by the trusted plugin interface request.

* * * * *